US011235622B2

(12) United States Patent
Mizushima

(10) Patent No.: US 11,235,622 B2
(45) Date of Patent: Feb. 1, 2022

(54) PNEUMATIC TIRE

(71) Applicant: The Yokohama Rubber Co., LTD., Tokyo (JP)

(72) Inventor: Haruna Mizushima, Hiratsuka (JP)

(73) Assignee: The Yokohama Rubber Co., LTD.

( * ) Notice: Subject to any disclaimer, the term of this patent is extended or adjusted under 35 U.S.C. 154(b) by 742 days.

(21) Appl. No.: 15/992,043

(22) Filed: May 29, 2018

(65) Prior Publication Data
US 2018/0339558 A1    Nov. 29, 2018

(30) Foreign Application Priority Data

May 29, 2017  (JP) .............................. JP2017-105905

(51) Int. Cl.
*B60C 11/12*       (2006.01)
*B60C 11/03*       (2006.01)

(52) U.S. Cl.
CPC .......... *B60C 11/12* (2013.01); *B60C 11/0306* (2013.01); *B60C 11/1218* (2013.01); *B60C 11/1236* (2013.01); *B60C 2011/0344* (2013.01); *B60C 2011/0346* (2013.01); *B60C 2011/0348* (2013.01); *B60C 2011/0358* (2013.01); *B60C 2011/0365* (2013.01); *B60C 2011/0369* (2013.01); *B60C 2011/0372* (2013.01); *B60C 2011/0381* (2013.01); *B60C 2011/0388* (2013.01); *B60C 2011/0395* (2013.01);
(Continued)

(58) Field of Classification Search
CPC ............. B60C 11/0306; B60C 11/0332; B60C 11/12; B60C 11/1218; B60C 11/1236; B60C 2011/0393; B60C 2011/0395; B60C 2011/0309; B60C 2011/0346; B60C 2011/0348; B60C 2011/036; B60C 2011/0365; B60C 2011/0369; B60C 2011/0381; B60C 2011/0374; B60C 2011/0376; B60C 2011/0379
See application file for complete search history.

(56) References Cited

U.S. PATENT DOCUMENTS

2009/0255614 A1    10/2009   Ebiko
2016/0207359 A1 *  7/2016    Nukushina .............. B60C 13/00

FOREIGN PATENT DOCUMENTS

EP      3081398 A1 *  10/2016  ......... B60C 11/0306
JP      H07-285303    10/1995
JP      2005-231430    9/2005
(Continued)

*Primary Examiner* — Steven D Maki
*Assistant Examiner* — Philip N Schwartz
(74) *Attorney, Agent, or Firm* — Thorpe North & Western

(57) ABSTRACT

A pneumatic tire includes first and second main grooves, and first sipes and auxiliary grooves on second land portions between the first and second main grooves, the auxiliary grooves opening to the second main grooves and terminating in the second land portions. The auxiliary grooves bend at a bend point and include a first portion extending from an opening end to the bend point, and a second portion extending from the bend point to a terminating end. A groove width of the first portion gradually reduces from the opening end to the bend point. Second sipes have an end that opens to each of the second main grooves and another end that opens to each of the terminating ends. Third sipes have an end that opens to the first main grooves and another end that opens to the first portions. The sipes are parallel to each other.

18 Claims, 8 Drawing Sheets

(52) U.S. Cl.
CPC .................. *B60C 2011/1209* (2013.01); *B60C 2011/1213* (2013.01)

(56) References Cited

FOREIGN PATENT DOCUMENTS

| | | | |
|---|---|---|---|
| JP | 2005231430 A * | 9/2005 | ............. B60C 11/03 |
| JP | 2009-248961 | 10/2009 | |
| JP | 2010-047134 | 3/2010 | |
| JP | 2014-205410 | 10/2014 | |
| JP | 2015-048048 | 3/2015 | |
| JP | 2015-189349 | 11/2015 | |
| WO | WO 2015/033818 | 3/2015 | |

* cited by examiner

PNEUMATIC TIRE

PRIORITY CLAIM

Priority is claimed to Japan Patent Application Serial No. 2017-105905 filed on May 29, 2017.

TECHNICAL FIELD

The present technology relates to a pneumatic tire.

BACKGROUND ART

Pneumatic tires including all-season tires may be required to have a tread pattern capable of increasing remaining cornering force (hereinafter referred to as remaining CF) a tire for controlling drifting of a vehicle to ensure straight-line performance. Snow performance representing running performance on snow is important for all-season tires. However, when the snow performance is improved, quietness might lower depending on a tread pattern. Such a pneumatic tire is known that improves both snow performance and quietness (e.g., Japan Unexamined Patent Publication No. 2014-205410). However, there is a demand for further improvement of snow performance, quietness, and remaining CF from the pneumatic tire described in Japan Unexamined Patent Publication No. 2014-205410.

SUMMARY

The present technology provides a pneumatic tire capable of improving snow performance, quietness, and remaining CF.

A pneumatic tire according to the technology includes: a pair of first main grooves that are formed on both outer sides, in a tire lateral direction, of a first land portion including a tire equatorial plane, and that each extend in a tire circumferential direction; a pair of second main grooves that lie outside, in the tire lateral direction, of the first main grooves, and that each extend in the tire circumferential direction; auxiliary grooves that are formed on each of second land portions between each of the first main grooves and each of the second main grooves, that each open to each of the second main grooves, and that each terminate in each of the second land portions; and first sipes inclined in a direction identical to a direction of the auxiliary grooves, and that cross each of the second land portions. The auxiliary grooves are each formed into a shape bending at a bend point, and each include a first groove portion extending from an opening end portion at which each of the auxiliary grooves opens to the bend point, and a second groove portion extending from the bend point to a terminating end portion at which each of the auxiliary grooves terminates. A groove width of each of the first groove portions gradually reduces from the opening end portion to the bend point. The pneumatic tire further includes second sipes and third sipes. The second sipes are inclined in a direction identical to the direction of the auxiliary grooves. The second sipes each have an end that opens to each of the second main grooves, and another end that opens to each of the terminating end portions at which each of the second groove portions terminates. The third sipes are inclined in a direction identical to the direction of the auxiliary grooves. The third sipes each have an end that opens to each of the first main grooves, and another end that opens to each of the first groove portions. The first sipes, the second sipes, and the third sipes are parallel to each other.

It is preferable that the pair of first main grooves and the pair of second main grooves be each formed into a zigzag shape including groove walls including short portions and long portions, in a plan view, and an inclination direction of the zigzag shapes be identical to the direction of the auxiliary grooves.

It is preferable that the second main grooves define third land portions outside, in the tire lateral direction, of the second main grooves, and lug grooves that are not communicating with the second main grooves be further provided on the third land portions.

It is preferable that circumferential narrow grooves each of which is formed into a zigzag shape inclined in a direction of the auxiliary grooves, and extends in the tire circumferential direction be further provided on the third land portions.

It is preferable that the lug grooves be inclined, in regions X ranging from 90% or greater to 110% or less of a ground contact width centered around the tire equatorial plane, at an angle α in a range of ±10 degrees or less. The angle α may be formed with a straight line along the tire lateral direction and a straight line joining midpoints, at both end portions of each of the regions X, of a groove width of each of the lug grooves. In regions each lying closer to the tire equatorial plane than the regions X, the lug grooves may be inclined in a direction identical to the inclination direction of the auxiliary grooves.

It is preferable that, in the regions each lying closer to the tire equatorial plane than the regions X ranging from 90% or greater to 110% or less of the ground contact width centered around the tire equatorial plane, three-dimensional (3D) sipes inclined in a direction identical to the inclination direction of the lug grooves be further included.

It is preferable that a distance between a boundary portion between each of the short portions and each of the long portions of the groove walls of the second main grooves and an end portion, lying adjacent to the tire equatorial plane, of each of the lug grooves range from 1.0 times or more to 4.0 times or less of a length of each of the short portions in the tire circumferential direction. It is also preferable that the boundary portion lie within a range of ±5 degrees of a direction from one of the midpoints of the groove width of each of the lug grooves, at the end portion of each of the regions X ranging from 90% or greater to 110% or less of the ground contact width centered around the tire equatorial plane, the end portion lying adjacent to the tire equatorial plane, to the end portion, lying adjacent to the tire equatorial plane, of each of the lug grooves.

It is preferable that, in each of the first groove portions, a groove depth gradually increase from the bend point to the opening end portion.

It is preferable that, in each of the first groove portions, the groove width at the bend point range from 50% or greater to 90% or less of the groove width at the opening end portion.

It is preferable that, in each of the first groove portions, the groove depth at the opening end portion range from 110% or greater to 150% or less of the groove depth at the bend point.

It is preferable that each of the first main grooves be disposed outside, in the tire lateral direction, of the tire equatorial plane. The first main grooves may define the first land portion. First land portion sipes may be further included. The first land portion sipes may open to each of the first main grooves. The first land portion sipes may each terminate in the first land portion.

It is preferable that the auxiliary grooves be inclined in the tire lateral direction so that a straight line joining each of the opening end portions and each of the terminating end portions approaches the tire equatorial plane relative to the tire circumferential direction.

It is preferable that ratios among an area of a first region surrounded by each of the first sipes, each of the second sipes, each of the third sipes, and each of the auxiliary grooves in the second land portions, an area of a second region surrounded by each of the second sipes and each of the auxiliary grooves in the second land portions, and an area of a third region surrounded by each of the first sipes, each of the third sipes, and each of the first groove portions in the second land portion be specified such that the area of the second region ranges from 1.0 times or more to 2.0 times or less of the area of the third region, and the area of the third region ranges from 1.0 times or more to 2.0 times or less of the area of the first regions.

It is preferable that a ratio between a distance between each of the third sipes and each of the second sipes and a distance between each of the third sipes and each of the first sipes range from 0.7 or higher to 1.2 or lower.

It is preferable that the pair of first main grooves be each formed into the zigzag shape including the groove walls including the short portions and the long portions, in a plan view. The zigzag shapes may each be formed with the long portions and the short portions alternately and repeatedly disposed in the tire circumferential direction. A length of each of the long portions in the tire circumferential direction may range from 10 times or more to 25 times or less of a length of each of the short portions in the tire circumferential direction.

It is preferable that the pair of first main grooves be each formed with the groove wall lying outside in the tire lateral direction and the groove wall lying inside in the tire lateral direction and adjacent to the tire equatorial plane. The long portions and the short portions may be disposed at identical pitches. Arrangement phases of the long portions and the short portions may differ between each of the groove walls lying outside in the tire lateral direction and each of the groove walls lying inside in the tire lateral direction and adjacent to the tire equatorial plane.

It is preferable that the pair of second main grooves be each formed into the zigzag shape including the groove walls including the short portions and the long portions, in a plan view. The zigzag shapes may each be formed with the long portions and the short portions alternately and repeatedly disposed in the tire circumferential direction. A length of each of the long portions in the tire circumferential direction may range from 10 times or more to 25 times or less of a length of each of the short portions in the tire circumferential direction.

It is preferable that the pair of second main grooves be each formed with the groove wall lying outside in the tire lateral direction and the groove wall lying inside in the tire lateral direction and adjacent to the tire equatorial plane. The long portions and the short portions may be disposed at identical pitches. Arrangement phases of the long portions and the short portions may differ between each of the groove walls lying outside in the tire lateral direction and each of the groove walls lying inside in the tire lateral direction and adjacent to the tire equatorial plane.

With the pneumatic tire according to the present technology, snow performance, quietness, and remaining CF can be improved.

DETAILED DESCRIPTION

A pneumatic tire according to an embodiment of the present technology will now be described herein in detail with reference to the drawings. However, the technology is not limited to the embodiment. Moreover, constituents of the embodiment include elements that are substitutable while maintaining consistency with the technology, and obviously substitutable elements. Furthermore, the modified examples described in the embodiment can be combined as desired within the scope apparent to those skilled in the art.

Figure 1:
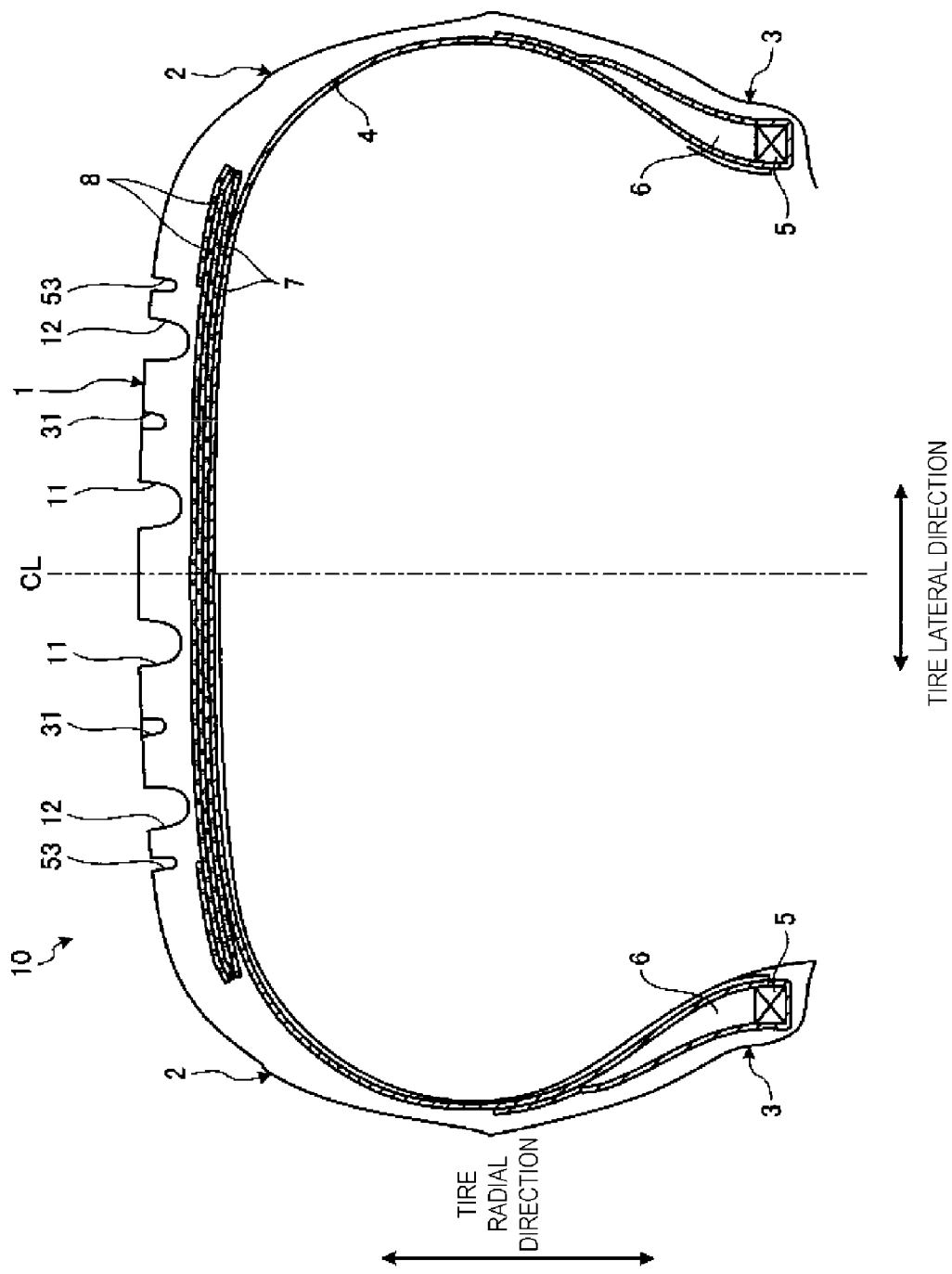
FIG. 1 is a meridian cross-sectional view illustrating a pneumatic tire according to an embodiment of the present technology.
Figure 2:
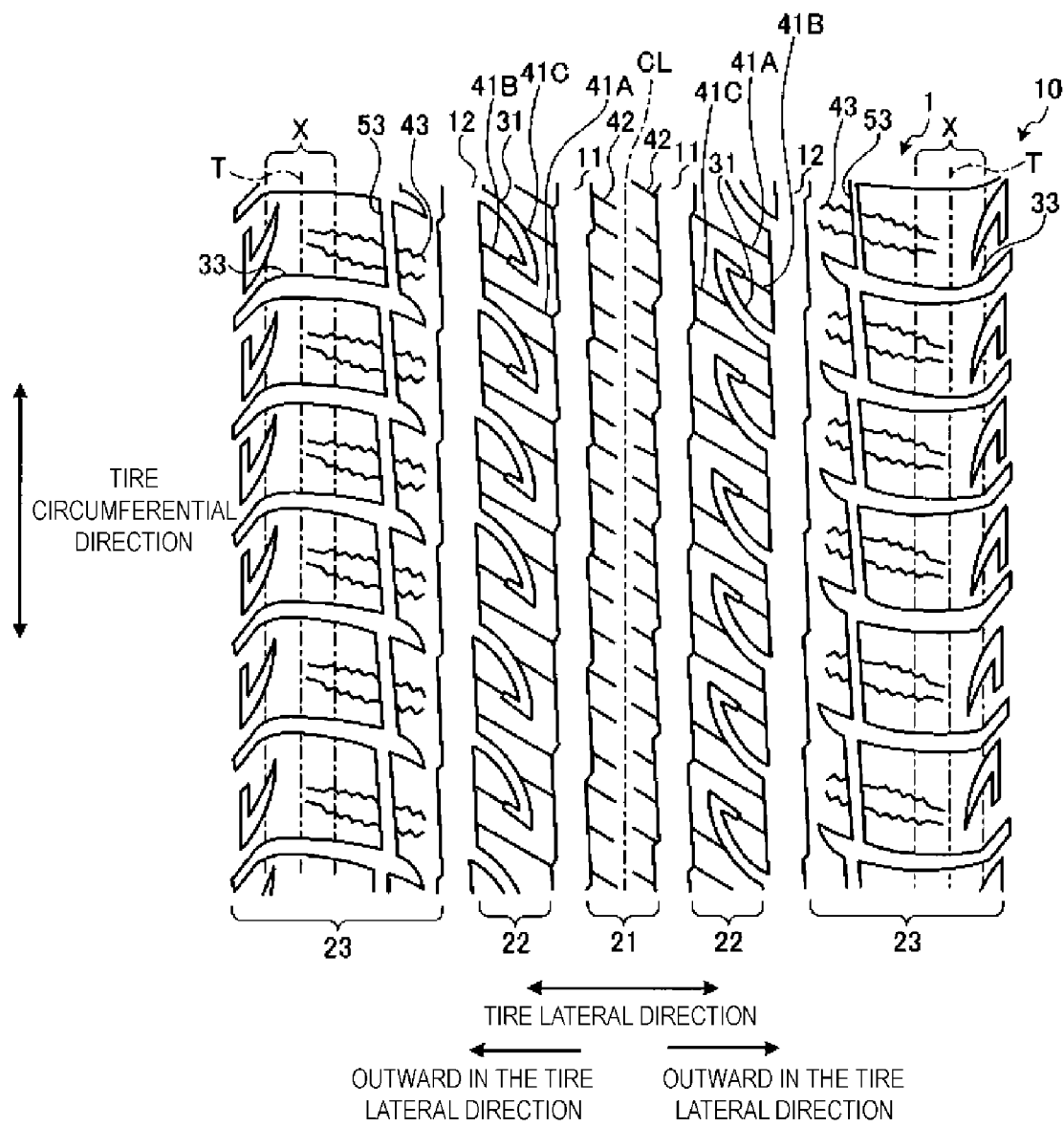
FIG. 2 is a developed view illustrating a tread pattern of the pneumatic tire according to the embodiment of the present technology.
Figure 3:
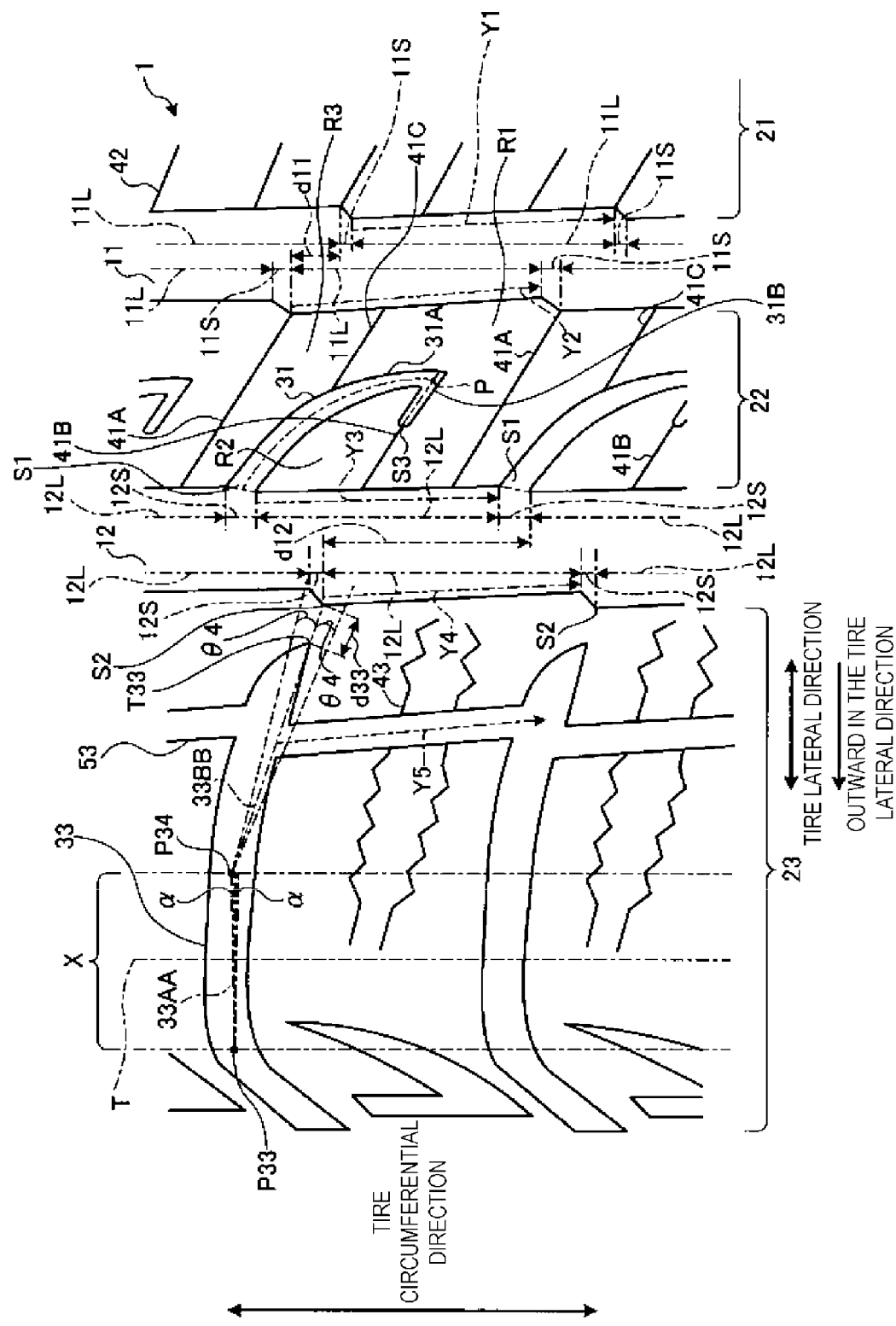
FIG. 3 is an enlarged plan view illustrating one of second land portions and one of third land portions, for example, on one side of the tread pattern in FIG. 2.
Figure 4:
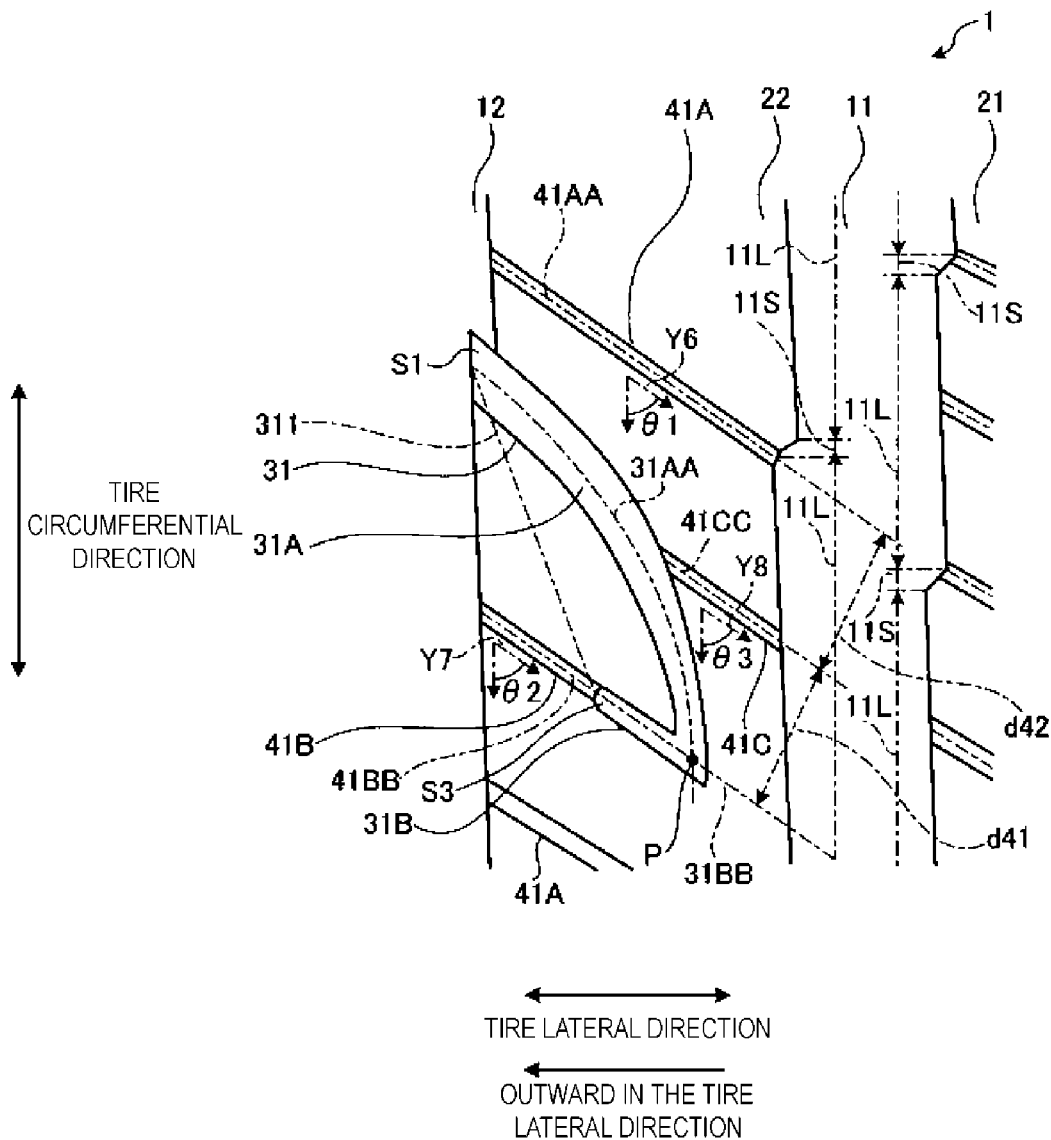
FIG. 4 is an enlarged plan view illustrating the one of the second land portions on the tread pattern in FIG. 2.

FIG. 1 is a meridian cross-sectional view illustrating a pneumatic tire according to an embodiment of the present technology. FIG. 2 is a developed view illustrating a tread pattern of the pneumatic tire according to the embodiment of the present technology. FIG. 3 is an enlarged plan view illustrating one of second land portions and one of third land portions, for example, on one side of the tread pattern in FIG. 2. FIG. 4 is an enlarged plan view illustrating the one of the second land portions on the tread pattern in FIG. 2.

Herein, "tire radial direction" refers to the direction orthogonal to the rotation axis (not illustrated) of a pneumatic tire 10. "Inward in the tire radial direction" refers to the direction toward the rotation axis in the tire radial direction. "Outward in the tire radial direction" refers to the direction away from the axis of rotation in the tire radial direction. "Tire circumferential direction" refers to the circumferential direction about the rotation axis regarded as the center axis. In addition, "tire lateral direction" refers to the direction parallel to the above described tire rotation axis. "Inward in the tire lateral direction" refers to the direction toward a tire equatorial plane CL in the tire lateral direction. "Outward in the tire lateral direction" refers to the direction away from the tire equatorial plane CL in the tire lateral direction. "Tire equatorial plane CL" refers to the plane that is orthogonal to the rotation axis of the pneumatic tire 10 and that passes through the center of the tire width of the pneumatic tire 10. "Tire width" refers to the width in the tire lateral direction between components located outward in the tire lateral direction, or, in other words, the distance between the components that are the most distant from the tire equatorial plane CL in the tire lateral direction. "Tire equator line" refers to the line that extends in the tire circumferential direction of the pneumatic tire 10 and that lies on the tire circumferential equatorial plane CL. In the present embodiment, the tire equator line and the tire equatorial plane are denoted by the same reference sign CL.

As illustrated in FIG. 1, the pneumatic tire 10 according to the present embodiment includes an annular tread portion 1 extending in the tire circumferential direction, a pair of sidewall portions 2 disposed on both sides of the tread portion 1, and a pair of bead portions 3 disposed inward of the sidewall portions 2 in the tire radial direction.

A carcass layer 4 is mounted between the pair of bead portions 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape and made of rubber composition is disposed on the outer circumference of each of the bead cores 5.

A plurality of belt layers 7 are embedded on an outer circumferential side of the carcass layer 4 in the tread portion 1. The belt layers 7 include a plurality of reinforcing cords that are inclined with respect to the tire circumferential direction, and the direction of the reinforcing cords of the different layers intersect with each other. In the belt layers 7, an inclination angle of the reinforcing cords with respect to the tire circumferential direction ranges from, for example, 10 degrees to 40 degrees. Steel cords are preferably used as the reinforcing cords of the belt layers 7. To improve high-speed durability, at least one belt cover layer 8 formed by arranging reinforcing cords at an angle of, for example, not greater than 5 degrees with respect to the tire circumferential direction, is disposed on an outer circumferential side of the belt layers 7. Nylon, aramid, or similar organic fiber cords are preferably used as the reinforcing cords of the belt cover layer 8.

Note that the tire internal structure described above represents a typical example for a pneumatic tire, and the pneumatic tire is not limited thereto. Tread portion FIG. 2 is a plan view illustrating a tread pattern of the pneumatic tire 10 illustrated in FIG. 1. Note that the reference sign T denotes a tire ground contact edge.

As illustrated in FIG. 2, the pneumatic tire 10 includes, on the tread portion 1, a pair of first main grooves 11 that lie on both outer sides, in the tire lateral direction, of the tire equatorial plane CL and that extend in the tire circumferential direction, a pair of second main grooves 12 that lie outside, in the tire lateral direction, of the first main grooves 11 and that extend in the tire circumferential direction, and auxiliary grooves 31 each formed on each of second land portions 22 between each of the first main grooves 11 and each of the second main grooves 12.

As illustrated in FIG. 2, the tread portion 1 is formed with the pair of first main grooves 11 that lie on both sides of the tire equatorial plane CL, and that extend in the tire circumferential direction, and the pair of second main grooves 12 that lie outside, in the tire lateral direction, of the first main grooves 11, and that extend in the tire circumferential direction. The first main grooves 11 and the second main grooves 12 are circumferential grooves with wear indicators that indicate the terminal stage of wear and that each typically has a groove width of 5.0 mm or greater and a groove depth of 7.5 mm or greater. The groove widths and the groove depths of the first main grooves 11 and the second main grooves 12 are not limited to the above described ranges.

Moreover, "lug groove", described later, refers to a lateral groove having a groove width of 2.0 mm or greater and a groove depth of 3.0 mm or greater. Additionally, "sipe", described later, refers to a cut formed on a land portion, which typically has a groove width of less than 1.5 mm.

The tread portion 1 formed with the first main grooves 11 and the second main grooves 12 is divided into a plurality of land portions. Specifically, when defined by the first main grooves 11, the tread portion 1 is formed with a land portion between the pair of first main grooves 11, representing a first land portion 21 that intersects the tire equatorial plane CL, and that extends in the tire circumferential direction. When defined by the first main grooves 11 and the second main grooves 12, the tread portion 1 is formed with land portions each laying between each of the first main grooves 11 and each of the second main grooves 12, representing second land portions 22 that extend in the tire circumferential direction. The tread portion 1 is further formed with land portions outside, in the tire lateral direction, of the second main grooves 12, representing third land portions 23.

The second land portions 22 are provided on both sides of the tire equatorial plane CL. The second land portions 22 on both sides of the tire equatorial plane CL are shaped and rotated 180 degrees from each other. The second land portions 22 are thus disposed in a point symmetry manner around the tire equatorial plane CL.

Each of the second land portions 22 between each of the first main grooves 11 and each of the second main grooves 12 is formed with a plurality of the auxiliary grooves 31 each separated at intervals in the tire circumferential direction. The auxiliary grooves 31 are each formed into a bent shape, similar to a fishing hook. As illustrated in FIGS. 3 and 4, the auxiliary grooves 31 each have an opening end portion at which each of the auxiliary grooves 31 opens to each of the second main grooves 12, and a terminating end portion, i.e., a terminating end portion S3, at which each of the auxiliary grooves 31 terminates in each of the second land portions 22. The auxiliary grooves 31 each formed with a first groove portion 31A that extends from the opening end portion, i.e., an opening end portion 51, at which each of the auxiliary grooves 31 opens to each of the second main grooves 12, to a bend point P, and a second groove portion 31B that extends from the bend point P to the terminating end portion S3. Positions of the opening end portion 51, the bend point P, and the terminating end portion S3 are determined based on a center line that joins centers, in a groove width direction, of the first groove portion 31A and the second groove portion 31B. In other words, the bend point P represents an intersection point between a center line 31AA of the first groove portion 31A and a center line 31BB of the second groove portion 31B. The auxiliary grooves 31 are each shaped by bending the second groove portion 31B at the bend point P toward the opening end portion S1 to each of the second main grooves 12 so that the terminating end portion S3 lies adjacent to each of the second main grooves 12.

It is preferable that the opening end portion S1 of each of the auxiliary grooves 31, which represents an opening portion to each of the second main grooves 12, join each of the second main grooves 12. By allowing the opening end portion of each of the auxiliary grooves 31 to open outward to each of the second main grooves 12 in the tire lateral direction, snow performance improves. The first groove portion 31A according to the present embodiment has the opening end portion S1 formed adjacent to each of the second main grooves 12. However, the opening end portion S1 may be provided adjacent to each of the first main grooves 11.

The groove width represents the maximum distance between the left and right groove walls at the groove opening portion, and is measured when the tire is mounted on a specified rim, inflated to the specified internal pressure, and in an unloaded state. In configurations in which the land portions include notch portions or chamfered portions on the edge portions thereof, the groove width is measured with reference to the intersection points where the tread contact surface and extension lines of the groove walls meet, in a cross-sectional view normal to the groove length direction. Additionally, in configuration in which the grooves extend in a zigzag or wave-like manner in the tire circumferential direction, the groove width is measured with reference to the center line of the amplitude of the groove walls.

The groove depth represents the maximum distance from the tread contact surface to the groove bottom, and is measured when the tire is mounted on a specified rim, inflated to the specified internal pressure, and in an unloaded state. Additionally, in configurations in which the grooves include an uneven portion or sipes on the groove bottom, the groove depth is measured excluding these portions.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, and a "LOAD CAPACITY" defined by ETRTO. However, in the case of JATMA, for a passenger vehicle tire, the specified internal pressure is an air pressure of 180 kPa, and the specified load is 88% of the maximum load capacity.

Auxiliary Groove

In the present embodiment, the auxiliary grooves 31 each open to each of the second main grooves 12, and each terminate in each of the second land portions 22. The auxiliary grooves 31 may each open to each of the first main grooves 11, instead of the second main grooves 12, and each terminate in each of the second land portions 22.

The auxiliary grooves 31 are each formed into the shape bending at the bent portion, i.e., the bend point P, and each include the first groove portion 31A extending from the opening end portion 51 to the bent portion, i.e., the bend point P, and the second groove portion 31B extending from the bent portion, i.e., the bend point P to the terminating end portion S3. A groove width of the first groove portion 31A gradually reduces from the opening end portion 51 to the bend point P. By providing the auxiliary grooves 31 that each open to each of the first main grooves 11 or each of the second main grooves 12, and that each having the bent portion, i.e., the bend point P, pattern noise and air column resonance are suppressed. With the shape having the bend point P presenting edge effects, and the feature in which a groove width reduces from the opening end portion 51 to the bend point P, snow inside the auxiliary grooves 31 is allowed to be easily removed, and snow performance improves.

Sipe

The tread portion 1 includes first sipes 41A that are inclined in a direction identical to the direction of the auxiliary grooves 31, and that cross each of the second land portions 22. The tread portion 1 further includes second sipes 41B that are inclined in a direction identical to the direction of the auxiliary grooves 31, and that each have an end that opens to each of the second main grooves 12, and another end that opens to the terminating end portion S3 at which the second groove portion 31B terminates. The tread portion 1 further includes third sipes 41C that are inclined in a direction identical to the direction of the auxiliary grooves 31, and that each have an end that opens to each of the first main grooves 11, and another end that opens to the first groove portion 31A. The third sipes 41C may each have an end that opens to each of the first main grooves 11, and another end that does not open to each of the auxiliary grooves 31, but terminates in each of the second land portions 22. The first sipes 41A, the second sipes 41B, and the third sipes 41C are parallel to each other. With the second groove portions 31B each bent toward the opening end portion S1 of each of the first groove portions 31A, as well as with the first sipes 41A, the second sipes 41B, and the third sipes 41C inclined in the direction identical to the direction of the auxiliary grooves 31, a remaining CF increases.

As illustrated in FIG. 3, in each block surrounded by two of the first sipes 41A, three regions R1, R2, and R3 are defined. On the second land portions 22, the regions R1 each represent a region surrounded by each of the first sipes 41A, each of the second sipes 41B, each of the third sipes 41C, and each of the auxiliary grooves 31. On the second land portions 22, the regions R2 each represent a region surrounded by each of the second sipes 41B and each of the auxiliary grooves 31. On the second land portions 22, the regions R3 each represent a region surrounded by each of the first sipes 41A, each of the third sipes 41C, and each of the first groove portions 31A. To balance rigidity among the regions R1, R2, and R3, it is preferable that ratios of areas among the regions R1, R2, and R3 be specified such that the area of R3 to the area of R2 ranges from 1.0 or higher to 2.0 or lower, while the area of R1 to the area of R3 ranges from 1.0 or higher to 2.0 or lower. As long as the ratios of areas among the regions R1, R2, and R3 respectively fall within the ranges, a certain region would be less likely to be worn unevenly and excessively. In a case where one or more of the ratios of areas among the regions R1, R2, and R3 exceed 2.0, the rigidity of the regions R1, R2, and R3 might be unbalanced. A certain region thus would be likely to be worn unevenly and excessively.

As illustrated in FIG. 4, the third sipes 41C are each provided between each of the first sipes 41A and each of the second sipes 41B. To balance the rigidity of the regions R1, R2, and R3, it is preferable that a ratio of d42/d41 between a distance d41 between each of the third sipes 41C and each of the second sipes 41B and a distance d42 between each of the third sipes 41C and each of the first sipes 41A range from 0.7 or higher to 1.2 or lower. In a case where the ratio of d42/d41 falls below 0.7 or exceeds 1.2, the rigidity of the regions R1, R2, and R3 might be unbalanced.

The first sipes 41A, the second sipes 41B, and the third sipes 41C may each be either a two-dimensional sipe (i.e., flat sipe) or a three-dimensional sipe (i.e., 3D sipe).

The two-dimensional sipe has sipe wall surfaces each formed into a straight shape, in a cross-sectional view normal to a sipe length direction (viewed in a cross-section including a sipe width direction and a sipe depth direction).

The two-dimensional sipe formed into a straight shape is enough, in a cross-sectional view, as described above. The two-dimensional sipe can be formed into a straight shape, a zigzag shape, a wave-like shape, or an arc shape, for example, to extend in the sipe length direction.

The three-dimensional sipe has sipe wall surfaces each formed into a bent shape to wave in the sipe width direction, in a cross-sectional view normal to the sipe length direction, as well as in a cross-sectional view normal to the sipe depth direction. Compared with the two-dimensional sipe, the three-dimensional sipe presents a greater meshing force between the opposing sipe wall faces and therefore acts to reinforce the rigidity of each of the land portions. The three-dimensional sipe having a structure as described above with the sipe wall surfaces is enough. On a tread contact surface, the three-dimensional sipes can each be formed into a straight shape, a zigzag shape, a wave-like shape, or an arc shape, for example.

Shapes of First and Second Main Grooves

As illustrated in FIGS. 2 and 3, it is preferable that the pair of first main grooves 11 each have groove walls each having short portions 11S and long portions 11L to form a zigzag shape, in a plan view. The zigzag shape formed by the groove walls of each of the first main grooves 11 is formed by alternately and repeatedly disposing the long portions 11L and the short portions 11S in the tire circumferential direction. It is preferable that a length of each of the long portions 11L in the tire circumferential direction range from 10 times or more to 25 times or less of a length of each of the short portions 11S in the tire circumferential direction, for example.

As illustrated in FIGS. 2 and 3, it is preferable that the pair of second main grooves 12 each have groove walls each having long portions 12L and short portions 12S to form a zigzag shape, in a plan view. The zigzag shape formed by the groove walls of each of the second main grooves 12 is formed by alternately and repeatedly disposing the long portions 12L and the short portions 12S in the tire circumferential direction. It is preferable that a length of each of the long portions 12L in the tire circumferential direction range from 10 times or more to 25 times or less of a length of each of the short portions 12S in the tire circumferential direction, for example.

On the groove walls, which lie outside in the tire lateral direction, and the groove walls, which lie inside in the tire lateral direction and adjacent to the tire equatorial plane CL, of the pair of first main grooves 11, the long portions 11L and the short portions 11S are disposed at identical pitches. However, arrangement phases of the long portions 11L and the short portions 11S differ between each of the groove walls, which lie outside in the tire lateral direction, and each of the groove walls, which lie inside in the tire lateral direction and adjacent to the tire equatorial plane CL. Distances d11 are defined due to this phase shifting as a result.

On the groove walls, which lie outside in the tire lateral direction, and the groove walls, which lie inside in the tire lateral direction and adjacent to the tire equatorial plane CL, of the pair of second main grooves 12, the long portions 12L and the short portions 12S are disposed at identical pitches. However, arrangement phases of the long portions 12L and the short portions 12S differ between each of the groove walls, which lie outside in the tire lateral direction, and each of the groove walls, which lie inside in the tire lateral direction and adjacent to the tire equatorial plane CL. Distances d12 are defined due to this phase shifting as a result.

It is preferable that inclination directions of the zigzag shapes of the first main grooves 11 and the second main grooves 12 be identical to the direction of the auxiliary grooves 31. Note that, when inclination directions are identical, inclination directions in the tire lateral direction with respect to the tire circumferential direction are identical. With the first main grooves 11 and the second main grooves 12 each formed into the zigzag shape as described above, air column resonance is suppressed, and snow performance is improved due to edge effects. With the first main grooves 11 and the second main grooves 12 both inclined in the direction identical to the direction of the auxiliary grooves 31, remaining CF increases.

Circumferential Narrow Groove

On the tread portion 1, the second main grooves 12 define the third land portions 23 outside, in the tire lateral direction, of the second main grooves 12. It is preferable that the tread portion 1 include circumferential narrow grooves 53 that are provided on the third land portions 23, and that extend in the tire circumferential direction. A groove width of each of the circumferential narrow grooves 53 is not particularly limited, and may be set so as to fall within a range from 1 mm to 25 mm, both inclusive, for example. It is preferable that the circumferential narrow grooves 53 be each formed into a zigzag shape inclined in a direction identical to an inclination direction of the auxiliary grooves 31. By providing the circumferential narrow grooves 53, pattern noise can be suppressed.

Lug Groove

It is preferable that the tread portion 1 include lug grooves 33 that are provided on the third land portions 23, and that are communicating with the second main grooves 12. By providing the lug grooves 33, snow performance improves. Due to its non-through style, air column resonance is suppressed.

The lug grooves 33 are inclined in a direction identical to the inclination direction of the auxiliary grooves 31 in regions closer to the tire equatorial plane CL than the regions X. The regions X refer to regions ranging from 90% or greater to 110% or less of a ground contact width representing a distance between the ground contact edges T centered around the tire equatorial plane CL. When a distance from the tire equatorial plane CL to one of the ground contact edges T is specified to a value of 50% of the ground contact width, one of the regions X is represented by a region ranging from 50%±5% of the ground contact width.

A straight line 33AA joining a midpoint P33 and a midpoint P34 of the groove width of each of the lug grooves 33, at both end portions of each of the regions X is approximately parallel to the tire lateral direction. The term "approximately parallel" used herein denotes that an angle formed with the straight line 33AA and a straight line along the tire lateral direction is equal to or below a predetermined angle. It is preferable that an angle α formed with the straight line along the tire lateral direction and the straight line 33AA joining the midpoints, i.e., the midpoint P33 and the midpoint P34, fall within a range of ±10 degrees or less relative to the tire lateral direction, for example. In other words, it is preferable that the midpoint P34 lie, around the midpoint P33, at an angle of 10 degrees or less in a counter-clockwise direction (i.e., +10 degrees or less), or at an angle of 10 degrees or less in a clockwise direction (i.e., −10 degrees or less), relative to the straight line parallel to the tire lateral direction. With the lug grooves 33 configured as described above, a remaining CF can be increased without increasing pattern noise.

Relationship Between Lug Grooves and Second Main Grooves

In FIG. 3, it is preferable that, on the tread portion 1, arrangement pitches, in the tire circumferential direction, of the short portions 12S and the long portions 12L on the groove walls, which lie outside in the tire lateral direction, of the second main grooves 12 be identical to arrangement pitches in the tire circumferential direction of the lug grooves 33. It is also preferable that end portions T33 of the lug grooves 33 be disposed so as to respectively face the short portions 12S on the groove walls, which lie outside in the tire lateral direction, of the second main grooves 12.

In FIG. 3, it is preferable that, on the tread portion 1, each of distances d33 between each of boundary portions S2 between each of the short portions 12S and each of the long portions 12L on each of the groove walls, which lie outside in the tire lateral direction, of the second main grooves 12 and each of the end portions T33, which face the tire equatorial plane CL, of the lug grooves 33 range from 1.0 times or more to 4.0 times or less of a length of each of the short portions 12S in the tire circumferential direction. A distance below 1.0 times is not preferable because a groove area increases, lowering rigidity. A distance above 4.0 times is not preferable because the inclination direction of the lug grooves 33 and the inclination direction of the second main grooves 12 would be less likely to match each other. As a result, a remaining CF would be less likely to increase.

The boundary portions S2 each lie within an angular range of ±θ4 in a direction from the midpoint P34 of the groove width of each of the lug grooves 33 at one of the end portions, which lies adjacent to the tire equatorial plane CL, of each of the regions X to each of the end portions T33, which face the tire equatorial plane CL, of the lug grooves 33. It is preferable that the angular range of ±θ4 be an angular range of ±5 degrees, for example. Within the angular range, tread rigidity increases, and a remaining CF would be further likely to increase.

Other Sipes

It is preferable that the tread portion 1 include, on the first land portion 21, a plurality of first land portion sipes 42. The plurality of first land portion sipes 42 are formed and separated at intervals in the tire circumferential direction. The plurality of first land portion sipes 42 are formed so as to extend in the tire lateral direction. The first land portion sipes 42 each have an end that opens to each of the first main grooves 11 and another end that terminates in the first land portion 21. The first land portion sipes 42 are not provided on the tire equatorial plane CL. More specifically, the first land portion sipes 42 each terminate in front of the tire equatorial plane CL without intersecting the tire equatorial plane CL, as well as each open to each of the first main grooves 11. A width of each of the first land portion sipes 42 is 1.2 mm or less, for example. By providing the first land portion sipes 42 as described above, snow performance can be improved without increasing pattern noise. The first land portion 21 is not provided with lug grooves.

It is also preferable that the tread portion 1 include, in regions closer to the tire equatorial plane CL than the regions X, third land portion sipes 43 that are 3D sipes inclined in a direction identical to the inclination direction of the lug grooves 33. By providing the 3D sipes inclined in the direction identical to the inclination direction of the lug grooves 33, tread rigidity increases, and a remaining CF would be further likely to increase.

Inclination Direction of Grooves

As illustrated in FIG. 3, an arrow Y1 extending in parallel to one of the groove walls, which lies adjacent to the tire equatorial plane CL, of each of the first main grooves 11 is inclined in the tire lateral direction so as to approach the tire equatorial plane CL relative to the tire circumferential direction. An arrow Y2 extending in parallel to another one of the groove walls, which lies away from the tire equatorial plane CL, of the first main grooves 11 is inclined in the tire lateral direction so as to approach the tire equatorial plane CL relative to the tire circumferential direction.

As illustrated in FIG. 3, an arrow Y3 extending in parallel to one of the groove walls, which lies adjacent to the tire equatorial plane CL, of the second main grooves 12 is inclined in the tire lateral direction so as to approach the tire equatorial plane CL relative to the tire circumferential direction. An arrow Y4 extending in parallel to another one of the groove walls, which lies away from the tire equatorial plane CL, of the second main grooves 12 is inclined in the tire lateral direction so as to approach the tire equatorial plane CL relative to the tire circumferential direction.

As illustrated in FIG. 3, an arrow Y5 extending along a center line passing through a center of a groove width of each of the circumferential narrow grooves 53 is inclined in the tire lateral direction so as to approach the tire equatorial plane CL relative to the tire circumferential direction. As described above, the arrow Y1 to the arrow Y5 are all inclined in the tire lateral direction so as to approach the tire equatorial plane CL relative to the tire circumferential direction. A straight line 33BB extending from each of the midpoints P34 to each of the end portions T33 is inclined in the tire lateral direction so as to approach the tire equatorial plane CL relative to the tire circumferential direction. As described above, on the tread portion 1, the inclination direction of the lug grooves 33 and the inclination directions of other grooves, i.e., the first main grooves 11, the second main grooves 12, and the circumferential narrow grooves 53 are identical. Inclination components of a whole pattern on the tread portion 1 thus increase. As a result, remaining CF can be increased.

As illustrated in FIG. 4, a straight line 311 joining the opening end portion S1 and the terminating end portion S3 of each of the auxiliary grooves 31 is inclined in the tire lateral direction so as to approach the tire equatorial plane CL relative to the tire circumferential direction. On the tread portion 1, the inclination direction of each of the auxiliary grooves 31 and the inclination directions of other grooves, i.e., the first main grooves 11, the second main grooves 12, and the circumferential narrow grooves 53 are identical. In other words, the inclination directions in the tire lateral direction relative to the tire circumferential direction are identical. The inclination components of the whole pattern on the tread portion 1 increase. As a result, remaining CF can be increased.

As illustrated in FIG. 3, the first land portion sipes 42 provided on the first land portion 21 are inclined in the tire lateral direction so as to approach the tire equatorial plane CL relative to the tire circumferential direction. The third land portion sipes 43 provided on the third land portions 23 are inclined in the tire lateral direction so as to approach the tire equatorial plane CL relative to the tire circumferential direction. Further, as illustrated in FIG. 4, the first sipes 41A, the second sipes 41B, and the third sipes 41C provided on the second land portions 22 are inclined in the tire lateral direction so as to approach the tire equatorial plane CL relative to the tire circumferential direction. As described above, on the tread portion 1, the inclination directions of the first sipes 41A, the second sipes 41B, the third sipes 41C, the first land portion sipes 42, and the third land portion sipes 43 and the inclination directions of the lug grooves 33 and the auxiliary grooves 31 are also identical. In other words, the inclination directions in the tire lateral direction relative to the tire circumferential direction are identical. The inclination components of the whole pattern on the tread portion 1 further increase. As a result, remaining CF can be further increased.

An angle formed with the tire circumferential direction and an arrow Y6 extending in parallel to a center line 41AA passing through a center of a groove width of each of the first sipes 41A is θ1. An angle formed with the tire circumferential direction and an arrow Y7 extending in parallel to a center line 41BB passing through a center of a groove width of each of the second sipes 41B is θ2. An angle formed with the tire circumferential direction and an arrow Y8 extending in parallel to a center line 41CC passing through a center of a groove width of each of the third sipes 41C is θ3. For example, θ1, θ2, and θ3 are angles each ranging from 40 degrees or greater to 80 degrees or less. In this example, θ1=θ2=θ3 is satisfied. At least one of θ1, θ2, and θ3 may be another angle.

Relationship with Ground Contact Shape

Figure 8:
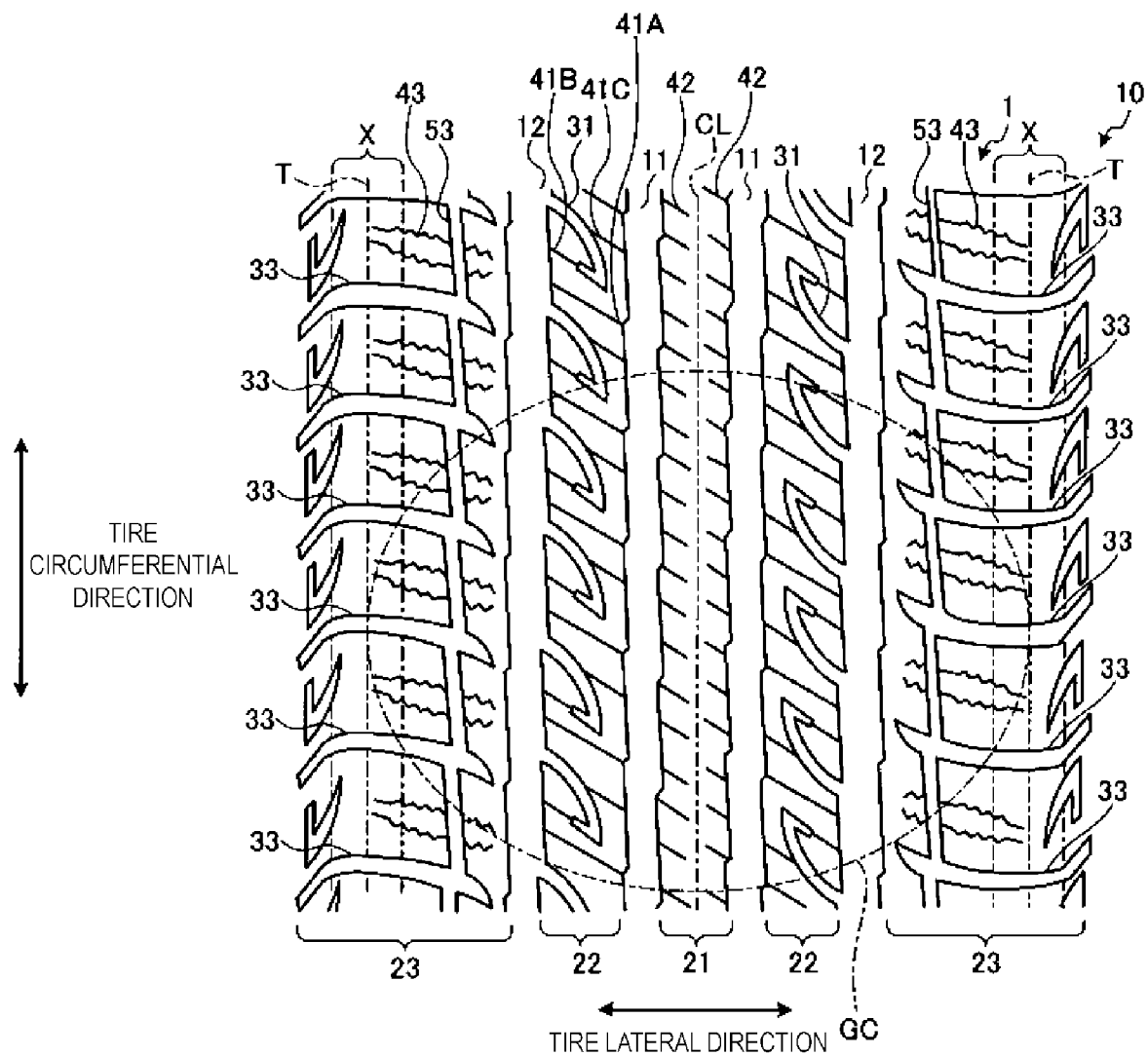
FIG. 8 is a view illustrating an example of a ground contact shape with respect to the tread pattern in FIG. 2.

FIG. 8 is a view illustrating an example of a ground contact shape with respect to the tread pattern in FIG. 2. In FIG. 8, a ground contact shape GC has a substantially elliptical shape. On the ground contact shape GC, end portions in the tire lateral direction conform to the ground contact edges T.

Figure 9:
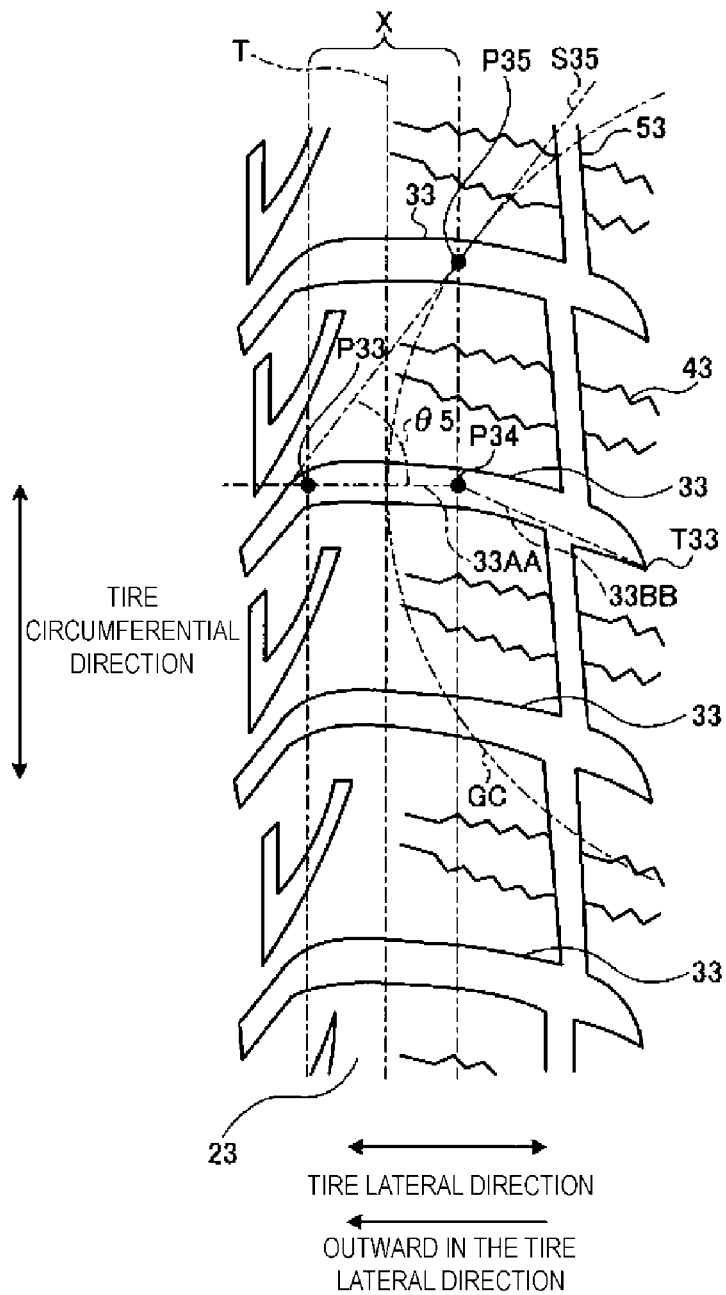
FIG. 9 is a partial enlarged view of the one of the third land portions in FIG. 8.

FIG. 9 is a partial enlarged view of one of the third land portions 23 in FIG. 8. In FIG. 9, a tangent line with respect to the ground contact shape GC, which passes through an intersection point P35 between the ground contact shape GC and one of the end portions, which lies adjacent to the tire equatorial plane CL, of one of the regions X is a tangent line S35. It is desirable that an angle θ5 formed with the straight line 33AA and the tangent line S35 range from 45 degrees or greater to 90 degrees or less. In a case where the angle is below 45 degrees, greater contact noise would be generated between the pneumatic tire 10 and a road surface when the end portions of the lug grooves 33 ground, reducing quietness.

As described above with reference to FIG. 3, on the regions X, when the angle α formed with the straight line along the tire lateral direction and the straight line 33AA joining the midpoint P33 and the midpoint P34 falls within a range of ±10 degrees or less relative to the tire lateral direction, the angle θ5 can be kept in a range from 45 degrees or greater to 90 degrees or less. Groove width of auxiliary groove In FIG. 3, it is preferable that a groove width at the bend point P representing the bent portion of the first groove portions 31A of each of the auxiliary grooves 31 range from 50% or greater to 90% or less of a groove width at the opening end portion S1. With a groove width falling within the above described range, snow accumulated in the first groove portions 31A easily comes off, improving snow performance.

Groove Depth of Auxiliary Groove

Figure 5:
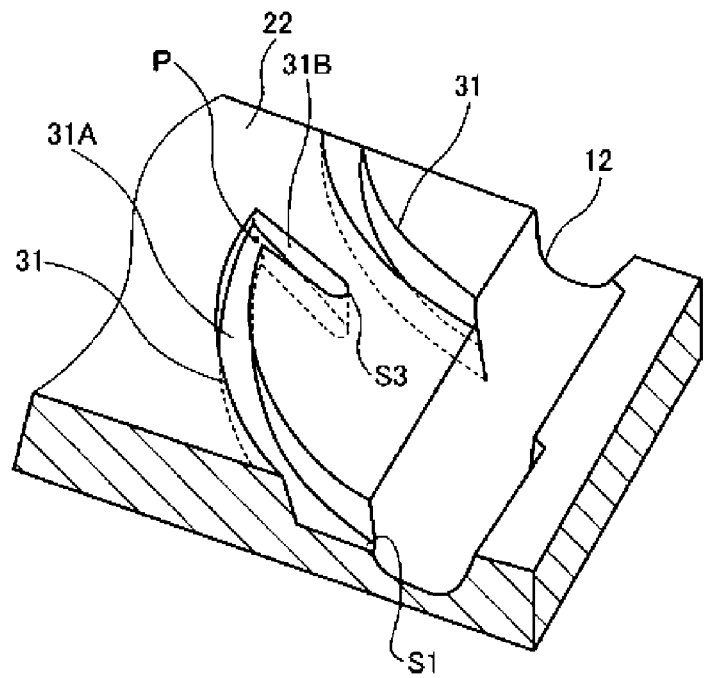
FIG. 5 is a partial-cut perspective view illustrating the one of the second land portions on a tread portion in FIG. 3.
Figure 6:
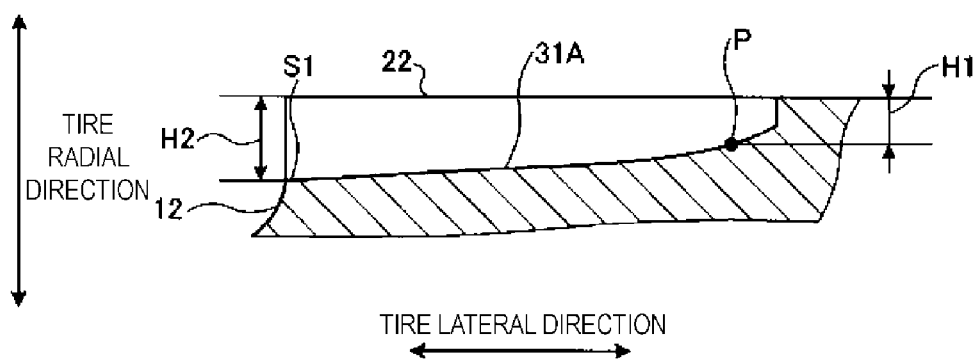
FIG. 6 is a cross-sectional view of the one of the second land portions, taken along a center of a groove width of one of first groove portions on the tread portion in FIG. 3.
Figure 7:
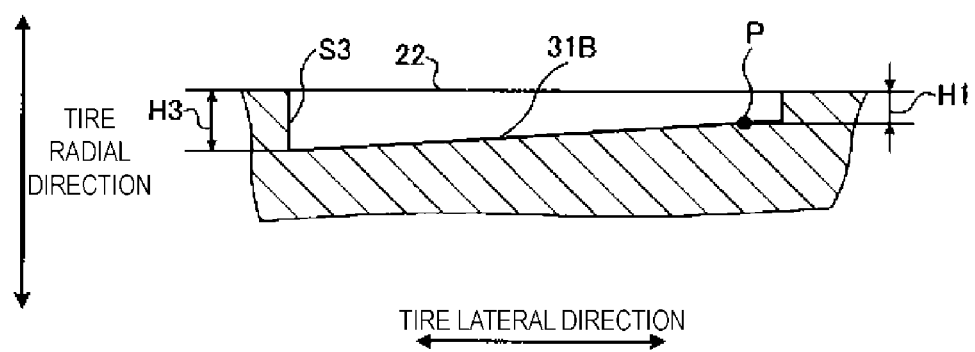
FIG. 7 is a cross-sectional view of the one of the second land portions, taken along a center of a groove width of one of second groove portions on the tread portion in FIG. 3.

Next, a groove depth of the auxiliary grooves 31 will now be described. FIG. 5 is a partial-cut perspective view illustrating one of the second land portions 22 on the tread portion 1 in FIG. 3. FIG. 6 is a cross-sectional view of the one of the second land portions 22, taken along a center of a groove width of one of the first groove portions 31A on the tread portion 1 in FIG. 3. FIG. 7 is a cross-sectional view of the one of the second land portions 22, taken along a center of a groove width of one of the second groove portions 31B on the tread portion 1 in FIG. 3. In FIG. 5, the first sipes 41A, the second sipes 41B, and the third sipes 41C are omitted.

As illustrated in FIGS. 5 and 6, it is preferable that the groove depth of the first groove portion 31A of each of the auxiliary grooves 31 gradually increase from the bent portion, i.e., the bend point P, to the opening end portion S1. In other words, it is preferable that the groove depth gradually change from a groove depth H1 at the bent portion, i.e., the bend point P, to a groove depth H2 at the opening end portion S1. With the groove depth gradually increasing from the bent portion, i.e., the bend point P, to the opening end portion S1, snow accumulated in the first groove portions 31A easily comes off, improving snow performance. It is preferable that the groove depth H2 at the opening end portion S1 of the first groove portion 31A of each of the auxiliary grooves 31 range from 110% or greater to 150% or less of the groove depth H1 at the bent portion, i.e., the bend point P. With a groove depth falling within the above described range, snow accumulated in the first groove portions 31A easily comes off, improving snow performance.

As illustrated in FIGS. 5 and 7, it is preferable that a groove depth at the second groove portion 31B of each of the auxiliary grooves 31 also gradually increases from the bend point P to the terminating end portion S3. In other words, it is preferable that the groove depth gradually changes from the groove depth H1 at the bent portion, i.e., the bend point P, to the groove depth H3 at the terminating end portion S3. With the groove depth changing within the above described range, snow accumulated in the second groove portions 31B easily comes off, improving snow performance.

Examples

Table 1 and Table 2 show the results of performance tests on the pneumatic tire according to the embodiment of the technology. In the performance tests, a plurality of mutually different pneumatic tires were also evaluated for remaining CF, quietness, and snow performance. In the performance tests, the pneumatic tires with a tire size of 205/60R16 92H were mounted on rims with a rim size of 16×6.5J and inflated to an air pressure of 240 kPa. Additionally, a front engine-front drive (FF) passenger car equipped with an engine having a displacement of 1500 cc was used as a test vehicle.

In the evaluations for remaining CF, the pneumatic tires were each rotated on a flap belt machine. For example, each of the tires was allowed to pressure contact with a belt face of the flap belt machine. A cornering force was measured as remaining CF when self-aligning torque that occurred due to rotation of the tire became 0. The self-aligning torque denotes a moment that occurs, in a direction orthogonal to a direction of a road surface, about an axis line passing through a center of a tire when a slip angle is applied to the rotating tire. A cornering force denotes a force that occurs in a direction of the axis line that passes through the center of the tire, and that is orthogonal to a direction toward which the rotating tire advances. The results of the evaluations for remaining CF were expressed as index values based on the tires according to a conventional example (i.e., based on a value of 100). In the evaluations, the larger the values, the more preferable the results.

In the evaluations for quietness, the test vehicle ran on dry road surfaces of a test course, and cabin noise was sensory evaluated. The results of the evaluations for quietness were expressed as index values based on the tires according to the conventional example (i.e., based on a value of 100). In the evaluations, the larger the values, the more preferable the results.

In the evaluations for snow performance, the test vehicle ran on snowy road surfaces of a test course, and expert test drivers sensory evaluated braking performance and driving performance. The results of the evaluations for snow performance were expressed as index values based on the tires according to the conventional example (i.e., based on a value of 100). In the evaluations, the larger the values, the more preferable the results.

The pneumatic tires according to Example 1 to Example 16 each included: a pair of first main grooves that were formed on both outer sides, in a tire lateral direction, of a first land portion including a tire equatorial plane, and that each extended in a tire circumferential direction; a pair of second main grooves that lied outside, in the tire lateral direction, of the above described first main grooves, and that each extended in the tire circumferential direction; auxiliary grooves that were formed on each of second land portions between each of the above described first main grooves and each of the above described second main grooves, that were each open to each of the above described second main grooves, and that each terminated in each of the above described second land portions; and first sipes that were inclined in a direction identical to a direction of the above described auxiliary grooves, and that crossed each of the above described second land portions. The above described auxiliary grooves were each formed into a shape bending at a bend point, and each included a first groove portion extending from an opening end portion at which each of the above described auxiliary grooves opened to the above described bend point, and a second groove portion extending from the above described bend point to a terminating end portion at which each of the auxiliary grooves terminated. A groove width of each of the above described first groove portions gradually reduced from the opening end portion to the above described bend point. The pneumatic tires each further included second sipes and third sipes. The second sipes were each inclined in a direction identical to the direction of the above described auxiliary grooves. The second sipes each had an end that opened to each of the above described second main grooves, and another end that opened to each of the terminating end portions at which each of the above described second groove portions terminated. The third sipes were inclined in a direction identical to the direction of the above described auxiliary grooves. The third sipes each had an end that opened to each of the above described first main grooves, and another end that opened to each of the above described first groove portions. The above described first sipes, the above described second sipes, and the above described third sipes were parallel to each other.

Example 1 to Example 16 were set in accordance with Table 1 and Table 2. In other words, the pneumatic tires were prepared as described below: the first main grooves and the second main grooves were each formed into a straight shape and a zigzag shape, respectively; the inclination directions of the first main grooves and the second main grooves were made identical to the direction of the auxiliary grooves; the auxiliary grooves were each formed into a bent shape; the inclination direction of the first to third sipes was made identical to the direction of the auxiliary grooves; the first sipes, the second sipes, and the third sipes were made parallel to each other; the groove widths at the opening end portions of the first groove portions were specified to 5.5 mm and 6 mm; the groove widths at the bend point of the first groove portions were specified to 3 mm and 5 mm; the groove depth at the opening end portions of the first groove portions were specified to 5.5 mm and 6 mm; the groove depths at the bend points of the first groove portions were specified to 4 mm, 5 mm, and 6 mm; the angles of the lug grooves in the regions X relative to the tire lateral direction were specified to −10 degrees, −5 degrees, 0 degrees, +5 degrees, and +10 degrees; the lug grooves were inclined or not inclined relative to the tire lateral direction in the regions closer to the tire equatorial plane CL than the regions X; the circumferential narrow grooves each formed into a zigzag shape inclined in the direction identical to the inclination direction of the auxiliary grooves were provided or not provided; the first land portion was provided with the sipes or not provided with the sipes; the sipes on the third land portions were each formed into a straight shape (flat shape) and a three-dimensional shape (3D shape); the ratios between the length of each of the short portions of each of the second main grooves in the tire circumferential direction and the distance between each of the lug grooves and each of the boundaries of each of the second main grooves were specified to 1.0, 2.0, 3.0, and 4.0; and the positional relationships between the inclination of each of the lug grooves and each of the boundary portions of each of the second main grooves were specified so as to fell within and outside of an angular range of ±04. The ratios between the groove width at the opening end portion of each of the first groove portions and the groove width at each of the bend points were 0.5 and 0.9, respectively. The ratios between the groove depth at the bend point of each of the first groove portions and the groove depth at each of the opening end portions were 1.0, 1.1, and 1.5.

On each of the pneumatic tires according to the conventional example, each of the main grooves was formed into a straight shape, and each of the auxiliary grooves did not bend, but crossed from each of the second main grooves to each of the first main grooves. For purpose of comparison, some pneumatic tires according to some comparative examples were further prepared: in Comparative example 1, main grooves were each formed into a straight shape; in Comparative example 2, main grooves were each formed into a zigzag shape, an inclination direction of each of the main grooves was opposite to a direction of auxiliary grooves, inclination directions of each of first to third sipes were opposite to the direction of the auxiliary grooves, and the first to third sipes were parallel to each other; and in Comparative example 3, main grooves were each formed into a straight shape, an inclination direction of the main grooves was identical to a direction of auxiliary grooves, inclination directions of each of first to third sipes were identical to the direction of the auxiliary grooves, and the first sipes, the second sipes, and the third sipes were not parallel to each other.

The pneumatic tires were evaluated for remaining CF, quietness, and snow performance with the evaluation methods described above. The results are shown in Table 1 and Table 2.

As illustrated in Table 1 and Table 2, fine results were acquired for remaining CF, quietness, and snow performance in conditions described below: the first main grooves and the second main grooves were each formed into a zigzag shape; the inclination directions of the first main grooves and the second main grooves were identical to the direction of the auxiliary grooves, as well as the inclination directions of the first to third sipes were identical to the direction of the auxiliary grooves; the first to third sipes were parallel to each other; the groove width at the bend point of each of the first groove portions ranged from 50% or greater to 90% or less of the groove width at the opening end portion; the groove depth at the opening end portion of each of the first groove portions ranged from 110% or greater to 150% or less of the groove depth at the bend point; the angle α formed with the straight line along the tire lateral direction and the straight line joining the midpoints of the groove width of each of the lug grooves, at both the end portions of each of the regions X, fell within a range of ±10 degrees or less, as well as the inclination direction of the lug grooves in the regions closer to the tire equatorial plane CL than the regions X was identical to the direction of the auxiliary grooves; the circumferential narrow grooves each formed into a zigzag shape inclined in the direction identical to the inclination direction of the auxiliary grooves were provided; the first land portion sipes were provided; the third land portion sipes were each formed into a 3D shape; and the distance between the boundary portion between each of the short portions and each of the long portions on one of the groove walls of each of the second main grooves and the end portion, which lied adjacent to the tire equatorial plane, of each of the lug grooves ranged from 1.0 times or more to 4.0 times or less of the length of each of the short portions in the tire circumferential direction, as well as the boundary portion lied within a range of ±5 degrees of the direction from the midpoint of the groove width of one of the lug grooves, at the end portion, which lied adjacent to the tire equatorial plane CL, of each of the regions X, to the end portion, which lied adjacent to the tire equatorial plane CL, of each of the lug grooves.

TABLE 1

|  | Conventional example | Comparative example 1 | Comparative example 2 | Comparative example 3 | Example 1 |
|---|---|---|---|---|---|
| Shape of main groove | Straight | Straight | Zigzag | Straight | Straight |
| Inclination direction of main groove | — | — | Opposite direction | Identical direction | — |
| Shape of auxiliary groove | Crossing | Bent shape | Bent shape | Bent shape | Bent shape |
| Inclination direction of sipe | — | — | Opposite direction | Identical direction | Identical direction |
| Relationship among sipes | — | — | Parallel | Not parallel | Parallel |
| Groove width at opening end portion of first groove portion (mm) | 6 | 3 | 6 | 6 | 6 |
| Groove width at bend point of first groove portion (mm) | 6 | 6 | 3 | 3 | 3 |
| Groove width at bend point/groove width at opening end portion | 1.0 | 2.0 | 0.5 | 0.5 | 0.5 |
| Groove depth at opening end portion of first groove portion (mm) | 6 | 6 | 6 | 6 | 6 |
| Groove depth at bend point of first groove portion (mm) | 6 | 6 | 6 | 6 | 6 |
| Groove depth at opening end portion/groove depth at bend point | 1.0 | 1.0 | 1.0 | 1.0 | 1.0 |
| Angle of lug groove on third land portion in region X (deg) | 0 | 0 | 0 | 0 | 0 |
| Presence/absence of inclination of lug groove on third land portion in other than region X | Absent | Absent | Absent | Absent | Absent |
| Presence/absence of circumferential narrow groove | Absent | Absent | Absent | Absent | Absent |
| Presence/absence of first land portion sipe | Absent | Absent | Absent | Absent | Absent |
| Shape of third land portion sipe | Straight | Straight | Straight | Straight | Straight |
| Distance between lug groove and second main groove/length of short portion | — | — | 0.5 | — | — |
| Positional relationship between inclination of lug groove and second main groove | Outside of range | Outside of range | Outside of range | Within range | Within range |
| Remaining CF | 100 | 100 | 100 | 102 | 103 |
| Quietness | 100 | 105 | 105 | 105 | 105 |
| Snow performance | 100 | 102 | 105 | 105 | 105 |

|  | Example 2 | Example 3 | Example 4 | Example 5 | Example 6 |
|---|---|---|---|---|---|
| Shape of main groove | Zigzag | Zigzag | Zigzag | Zigzag | Zigzag |
| Inclination direction of main groove | Identical direction | Identical direction | Identical direction | Identical direction | Identical direction |
| Shape of auxiliary groove | Bent shape | Bent shape | Bent shape | Bent shape | Bent shape |
| Inclination direction of sipe | Identical direction | Identical direction | Identical direction | Identical direction | Identical direction |
| Relationship among sipes | Parallel | Parallel | Parallel | Parallel | Parallel |
| Groove width at opening end portion of first groove portion (mm) | 6 | 6 | 6 | 5.5 | 6 |
| Groove width at bend point of first groove portion (mm) | 3 | 3 | 3 | 5 | 3 |

TABLE 1-continued

| | | | | | |
|---|---|---|---|---|---|
| Groove width at bend point/groove width at opening end portion | 0.5 | 0.5 | 0.5 | 0.9 | 0.5 |
| Groove depth at opening end portion of first groove portion (mm) | 6 | 6 | 6 | 6 | 5.5 |
| Groove depth at bend point of first groove portion (mm) | 6 | 4 | 4 | 4 | 5 |
| Groove depth at opening end portion/groove depth at bend point | 1.0 | 1.5 | 1.5 | 1.5 | 1.1 |
| Angle of lug groove on third land portion in region X (deg) | 0 | 0 | 0 | 0 | 0 |
| Presence/absence of inclination of lug groove on third land portion in other than region X | Absent | Absent | Absent | Absent | Absent |
| Presence/absence of circumferential narrow groove | Absent | Absent | Absent | Absent | Absent |
| Presence/absence of first land portion sipe | Absent | Absent | Present | Present | Present |
| Shape of third land portion sipe | Straight | Straight | Straight | Straight | Straight |
| Distance between lug groove and second main groove/length of short portion | 1.0 | 1.0 | 2.0 | 2.0 | 2.0 |
| Positional relationship between inclination of lug groove and second main groove | Within range | Within range | Within range | Within range | Within range |
| Remaining CF | 105 | 105 | 107 | 107 | 107 |
| Quietness | 105 | 107 | 108 | 108 | 108 |
| Snow performance | 105 | 107 | 108 | 106 | 106 |

TABLE 2

| | Example 7 | Example 8 | Example 9 | Example 10 | Example 11 |
|---|---|---|---|---|---|
| Shape of main groove | Zigzag | Zigzag | Zigzag | Zigzag | Zigzag |
| Inclination direction of main groove | Identical direction | Identical direction | Identical direction | Identical direction | Identical direction |
| Shape of auxiliary groove | Bent shape | Bent shape | Bent shape | Bent shape | Bent shape |
| Inclination direction of sipe | Identical direction | Identical direction | Identical direction | Identical direction | Identical direction |
| Relationship among sipes | Parallel | Parallel | Parallel | Parallel | Parallel |
| Groove width at opening end portion of first groove portion (mm) | 6 | 6 | 6 | 6 | 6 |
| Groove width at bend point of first groove portion (mm) | 3 | 3 | 3 | 3 | 3 |
| Groove width at bend point/groove width at opening end portion | 0.5 | 0.5 | 0.5 | 0.5 | 0.5 |
| Groove depth at opening end portion of first groove portion (mm) | 6 | 6 | 6 | 6 | 6 |
| Groove depth at bend point of first groove portion (mm) | 4 | 4 | 4 | 4 | 4 |
| Groove depth at opening end portion/groove depth at bend point | 1.5 | 1.5 | 1.5 | 1.5 | 1.5 |
| Angle of lug groove on third land portion in region X (deg) | +5 | +10 | −5 | −10 | 0 |
| Presence/absence of inclination of lug groove on third land portion in other than region X | Absent | Absent | Absent | Absent | Present |
| Presence/absence of circumferential narrow groove | Absent | Absent | Absent | Absent | Absent |
| Presence/absence of first land portion sipe | Present | Present | Present | Present | Present |
| Shape of third land portion sipe | Straight | Straight | Straight | Straight | Straight |
| Distance between lug groove and second main groove/length of short portion | 2.0 | 2.0 | 2.0 | 2.0 | 2.0 |
| Positional relationship between inclination of lug groove and second main groove | Within range | Within range | Within range | Within range | Within range |
| Remaining CF | 107 | 108 | 107 | 106 | 110 |
| Quietness | 106 | 103 | 106 | 103 | 107 |
| Snow performance | 109 | 110 | 109 | 110 | 109 |

TABLE 2-continued

|  | Example 12 | Example 13 | Example 14 | Example 15 | Example 16 |
|---|---|---|---|---|---|
| Shape of main groove | Zigzag | Zigzag | Zigzag | Zigzag | Zigzag |
| Inclination direction of main groove | Identical direction | Identical direction | Identical direction | Identical direction | Identical direction |
| Shape of auxiliary groove | Bent shape | Bent shape | Bent shape | Bent shape | Bent shape |
| Inclination direction of sipe | Identical direction | Identical direction | Identical direction | Identical direction | Identical direction |
| Relationship among sipes | Parallel | Parallel | Parallel | Parallel | Parallel |
| Groove width at opening end portion of first groove portion (mm) | 6 | 6 | 6 | 6 | 6 |
| Groove width at bend point of first groove portion (mm) | 3 | 3 | 3 | 3 | 3 |
| Groove width at bend point/groove width at opening end portion | 0.5 | 0.5 | 0.5 | 0.5 | 0.5 |
| Groove depth at opening end portion of first groove portion (mm) | 6 | 6 | 6 | 6 | 6 |
| Groove depth at bend point of first groove portion (mm) | 4 | 4 | 4 | 4 | 4 |
| Groove depth at opening end portion/groove depth at bend point | 1.5 | 1.5 | 1.5 | 1.5 | 1.5 |
| Angle of lug groove on third land portion in region X (deg) | 0 | 0 | 0 | 0 | 0 |
| Presence/absence of inclination of lug groove on third land portion in other than region X | Present | Present | Present | Present | Present |
| Presence/absence of circumferential narrow groove | Absent | Absent | Absent | Present | Present |
| Presence/absence of first land portion sipe | Present | Present | Present | Present | Present |
| Shape of third land portion sipe | Straight | Straight | Straight | Straight | 3D |
| Distance between lug groove and second main groove/length of short portion | 3.0 | 4.0 | 3.0 | 4.0 | 3.0 |
| Positional relationship between inclination of lug groove and second main groove | Within range | Within range | Within range | Within range | Within range |
| Remaining CF | 108 | 106 | 107 | 107 | 108 |
| Quietness | 108 | 109 | 108 | 110 | 109 |
| Snow performance | 108 | 107 | 108 | 107 | 109 |

The invention claimed is:

1. A pneumatic tire, comprising:
a pair of first main grooves formed on both outer sides, in a tire lateral direction, of a first land portion including a tire equatorial plane, the pair of first main grooves extending in a tire circumferential direction;
a pair of second main grooves lying outside, in the tire lateral direction, of the first main grooves, the pair of second main grooves extending in the tire circumferential direction;
auxiliary grooves formed on each of second land portions between one of the first main grooves and one of the second main grooves, the auxiliary grooves each opening to each of the second main grooves, the auxiliary grooves each terminating in one of the second land portions; and
first sipes inclined in a direction identical to a direction of the auxiliary grooves, the first sipes crossing each of the second land portions, wherein
the auxiliary grooves are each formed into a shape bending at a bend point, and each comprise:
a first groove portion extending from an opening end portion at which each of the auxiliary grooves opens to the bend point; and
a second groove portion extending from the bend point to a terminating end portion at which each of the auxiliary grooves terminates,
a groove width of each of the first groove portions gradually reduces from the opening end portion to the bend point,
the pneumatic tire further comprises:
second sipes inclined in a direction identical to the direction of the auxiliary grooves, the second sipes each having an end that opens to each of the second main grooves, and another end that opens to each of the terminating end portions at which each of the second groove portions terminates; and
third sipes inclined in a direction identical to the direction of the auxiliary grooves, the third sipes each having an end that opens to each of the first main grooves, and another end that opens to each of the first groove portions, the first sipes, the second sipes, and the third sipe are parallel to each other, and
a ratio between a distance between each of the third sipes and each of the second sipes and a distance between each of the third sipes and each of the first sipes ranges from 0.7 or higher to 1.2 or lower.

2. The pneumatic tire according to claim 1, wherein
the pair of first main grooves and the pair of second main grooves are each formed into a zigzag shape having groove walls having short portions and long portions, in a plan view, and
an inclination direction of the zigzag shapes is identical to the direction of the auxiliary grooves.

3. The pneumatic tire according to claim 1, wherein
the second main grooves define third land portions outside, in the tire lateral direction, of the second main grooves, and
lug grooves are further provided on the third land portions, the lug grooves being not communicated with the second main grooves.

4. The pneumatic tire according to claim 3, further comprising circumferential narrow grooves provided on the third land portions, the circumferential narrow grooves each extending in the tire circumferential direction, the circumferential narrow grooves each being formed into a zigzag shape inclined in a direction identical to an inclination direction of the auxiliary grooves.

5. The pneumatic tire according to claim 3, wherein
the lug grooves are inclined, in regions X ranging from 90% or greater to 110% or less of a ground contact width centered around the tire equatorial plane, at an angle α in a range of ±10 degrees or less, the angle α being formed with a straight line along the tire lateral direction and a straight line joining midpoints, at both end portions of each of the regions X, of a groove width of each of the lug grooves, and
in regions each lying closer to the tire equatorial plane than the regions X, the lug grooves are inclined in a direction identical to the inclination direction of the auxiliary grooves.

6. The pneumatic tire according to claim 3, further comprising, in regions each lying closer to the tire equatorial plane than regions X ranging from 90% or greater to 110% or less of a ground contact width centered around the tire equatorial plane, three-dimensional (3D) sipes inclined in a direction identical to the inclination direction of the lug grooves.

7. The pneumatic tire according to claim 3, wherein
a distance between a boundary portion between each of short portions and each of long portions of groove walls of the second main grooves and an end portion, lying adjacent to the tire equatorial plane, of each of the lug grooves ranges from 1.0 times or more to 4.0 times or less of a length of each of the short portions in the tire circumferential direction, and
the boundary portion lies within a range of ±5 degrees of a direction from a midpoint of the groove width of each of the lug grooves, at the end portion of each of regions X ranging from 90% or greater to 110% or less of a ground contact width centered around the tire equatorial plane, the end portion lying adjacent to the tire equatorial plane, to the end portion, lying adjacent to the tire equatorial plane, of each of the lug grooves.

8. The pneumatic tire according to claim 1, wherein, in each of the first groove portions, a groove depth gradually increases from the bend point to the opening end portion.

9. The pneumatic tire according to claim 1, wherein, in each of the first groove portions, the groove width at the bend point ranges from 50% or greater to 90% or less of the groove width at the opening end portion.

10. The pneumatic tire according to claim 1, wherein, in each of the first groove portions, a groove depth at the opening end portion ranges from 110% or greater to 150% or less of a groove depth at the bend point.

11. The pneumatic tire according to claim 1, wherein
the first main grooves are each disposed outside, in the tire lateral direction, of the tire equatorial plane,
the first main grooves define the first land portion, and
first land portion sipes are further included, the first land portion sipes each opening to one of the first main grooves, the first land portion sipes each terminating in the first land portion.

12. The pneumatic tire according to claim 1, wherein the auxiliary grooves are inclined in the tire lateral direction so that a straight line joining each of the opening end portions and each of the terminating end portions approaches the tire equatorial plane relative to the tire circumferential direction.

13. The pneumatic tire according to claim 1, wherein ratios among an area of a first region surrounded by each of the first sipes, each of the second sipes, each of the third sipes, and each of the auxiliary grooves in the second land portions, an area of a second region surrounded by each of the second sipes and each of the auxiliary grooves in the second land portions, and an area of a third region surrounded by each of the first sipes, each of the third sipes, and each of the first groove portions in the second land portions are specified such that the area of the second region ranges from 1.0 times or more to 2.0 times or less of the area of the third region, and the area of the third region ranges from 1.0 times or more to 2.0 times or less of the area of the first region.

14. The pneumatic tire according to claim 1, wherein
the pair of first main grooves are each formed into a zigzag shape having groove walls having the short portions and the long portions, in a plan view,
the zigzag shapes are each formed with long portions and short portions alternately and repeatedly disposed in the tire circumferential direction, and
a length of each of the long portions in the tire circumferential direction ranges from 10 times or more to 25 times or less of a length of each of the short portions in the tire circumferential direction.

15. The pneumatic tire according to claim 14, wherein
the pair of first main grooves are each formed with one of the groove walls lying outside in the tire lateral direction and another one of the groove walls lying inside in the tire lateral direction and adjacent to the tire equatorial plane,
the long portions and the short portions are disposed at identical pitches, and
arrangement phases of the long portions and the short portions differ between each of the groove walls lying outside in the tire lateral direction and each of the groove walls lying inside in the tire lateral direction and adjacent to the tire equatorial plane.

16. The pneumatic tire according to claim 1, wherein
the pair of second main grooves are each formed into a zigzag shape having groove walls having short portions and long portions, in a plan view,
the zigzag shapes are each formed with the long portions and the short portions alternately and repeatedly disposed in the tire circumferential direction, and
a length of each of the long portions in the tire circumferential direction ranges from 10 times or more to 25 times or less of a length of each of the short portions in the tire circumferential direction.

17. The pneumatic tire according to claim 16, wherein
the pair of second main grooves are each formed with the groove wall lying outside in the tire lateral direction and the groove wall lying inside in the tire lateral direction and adjacent to the tire equatorial plane,
the long portions and the short portions are disposed at identical pitches, and
arrangement phases of the long portions and the short portions differ between each of the groove walls lying outside in the tire lateral direction and each of the groove walls lying inside in the tire lateral direction and adjacent to the tire equatorial plane.

18. A pneumatic tire, comprising:
a pair of first main grooves formed on both outer sides, in a tire lateral direction, of a first land portion including a tire equatorial plane, the pair of first main grooves extending in a tire circumferential direction;

a pair of second main grooves lying outside, in the tire lateral direction, of the first main grooves, the pair of second main grooves extending in the tire circumferential direction;

auxiliary grooves formed on each of second land portions between one of the first main grooves and one of the second main grooves, the auxiliary grooves each opening to each of the second main grooves, the auxiliary grooves each terminating in one of the second land portions; and first sipes inclined in a direction identical to a direction of the auxiliary grooves, the first sipes crossing each of the second land portions, wherein the auxiliary grooves are each formed into a shape bending at a bend point, and each comprise:
 a first groove portion extending from an opening end portion at which each of the auxiliary grooves opens to the bend point; and
 a second groove portion extending from the bend point to a terminating end portion at which each of the auxiliary grooves terminates, a groove width of each of the first groove portions gradually reduces from the opening end portion to the bend point, the pneumatic tire further comprises:
 second sipes inclined in a direction identical to the direction of the auxiliary grooves, the second sipes each having an end that opens to each of the second main grooves, and another end that opens to each of the terminating end portions at which each of the second groove portions terminates; and
 third sipes inclined in a direction identical to the direction of the auxiliary grooves, the third sipes each having an end that opens to each of the first main grooves, and another end that opens to each of the first groove portions, the first sipes, the second sipes, and the third sipe are parallel to each other, and ratios among an area of a first region surrounded by each of the first sipes, each of the second sipes, each of the third sipes, and each of the auxiliary grooves in the second land portions, an area of a second region surrounded by each of the second sipes and each of the auxiliary grooves in the second land portions, and an area of a third region surrounded by each of the first sipes, each of the third sipes, and each of the first groove portions in the second land portions are specified such that the area of the second region ranges from 1.0 times or more to 2.0 times or less of the area of the third region, and the area of the third region ranges from 1.0 times or more to 2.0 times or less of the area of the first region.

* * * * *